US012621389B2

(12) United States Patent
Xue et al.

(10) Patent No.: US 12,621,389 B2
(45) Date of Patent: May 5, 2026

(54) CONFERENCE TERMINAL AND ECHO CANCELLATION METHOD

(71) Applicant: ZHEJIANG ALIBABA ROBOT CO., LTD., Hangzhou (CN)

(72) Inventors: Cheng Xue, Hangzhou City (CN); Weilong Huang, Hangzhou City (CN); Jinwei Feng, Winchester, MA (US)

(73) Assignee: ZHEJIANG ALIBABA ROBOT CO., LTD., Hangzhou (CN)

( * ) Notice: Subject to any disclaimer, the term of this patent is extended or adjusted under 35 U.S.C. 154(b) by 159 days.

(21) Appl. No.: 18/685,188

(22) PCT Filed: Oct. 22, 2021

(86) PCT No.: PCT/CN2021/125763
§ 371 (c)(1),
(2) Date: Feb. 20, 2024

(87) PCT Pub. No.: WO2023/065317
PCT Pub. Date: Apr. 27, 2023

(65) Prior Publication Data
US 2025/0141998 A1     May 1, 2025

(51) Int. Cl.
*H04M 9/08* (2006.01)
*G10L 21/0208* (2013.01)

(52) U.S. Cl.
CPC ......... *H04M 9/082* (2013.01); *G10L 21/0208* (2013.01); *G10L 2021/02082* (2013.01)

(58) Field of Classification Search
CPC ............... H04M 9/082; G10L 21/0208; G10L 2021/02082; G10L 21/02; H04R 3/02
See application file for complete search history.

(56) References Cited

U.S. PATENT DOCUMENTS

| | | | |
|---|---|---|---|
| 7,657,038 B2* | 2/2010 | Doclo | G10L 21/0208 379/406.01 |
| 8,942,382 B2* | 1/2015 | Elko | H04M 9/082 379/406.01 |

(Continued)

FOREIGN PATENT DOCUMENTS

| | | |
|---|---|---|
| CN | 101763858 | 6/2010 |
| CN | 104464739 | 3/2015 |

(Continued)

OTHER PUBLICATIONS

English Translation of International Search Report for International PCT Patent Application No. PCT/CN2021/125763 mailed Jul. 12, 2022 (3 pages).

*Primary Examiner* — Lisa Hashem
(74) *Attorney, Agent, or Firm* — The Sun IP Law

(57) ABSTRACT

A conference terminal, an echo cancellation method and apparatus, and a sound pickup device are provided. The conference terminal comprises a loudspeaker and at least one omni-directional microphone group. The omni-directional microphone group comprises at least two omni-directional microphones. According to the conference terminal, a weight vector of a beam former enabling the at least two omni-directional microphones to form a dipole beam mode is determined, so that an echo signal in the direction of the loudspeaker is suppressed, and a sound signal in a target direction is enhanced. The sound signal is collected by means of the omni-directional microphones. For the at least two omnidirectional microphones, the weighted sum of at least two sound signals is determined according to the weight vector as an echo cancellation signal.

20 Claims, 2 Drawing Sheets

(56)  References Cited

U.S. PATENT DOCUMENTS

| | | | |
|---|---|---|---|
| 12,052,393 B2 * | 7/2024 | Pandey | H04M 9/082 |
| 12,094,484 B2 * | 9/2024 | Li | G10L 17/02 |
| 12,309,326 B2 * | 5/2025 | Wells-Rutherford | |
| | | | G10L 21/0232 |
| 12,380,912 B2 * | 8/2025 | Therkelsen | G10L 25/78 |
| 2003/0053639 A1 * | 3/2003 | Beaucoup | G10L 25/78 |
| | | | 704/208 |
| 2011/0158418 A1 * | 6/2011 | Bai | H04B 3/23 |
| | | | 381/66 |
| 2022/0060819 A1 * | 2/2022 | Dobos | H04R 1/04 |
| 2023/0115674 A1 * | 4/2023 | Nighman | H04R 1/406 |
| | | | 381/58 |

FOREIGN PATENT DOCUMENTS

| | | | | |
|---|---|---|---|---|
| CN | 110085247 | | 8/2019 | |
| CN | 111312269 | | 6/2020 | |
| CN | 111866439 | | 10/2020 | |
| CN | 111918169 | | 11/2020 | |
| CN | 115512712 A | * | 12/2022 | G10L 21/0216 |
| JP | 2007251406 | | 9/2007 | |
| WO | 2009034524 | | 3/2009 | |

* cited by examiner

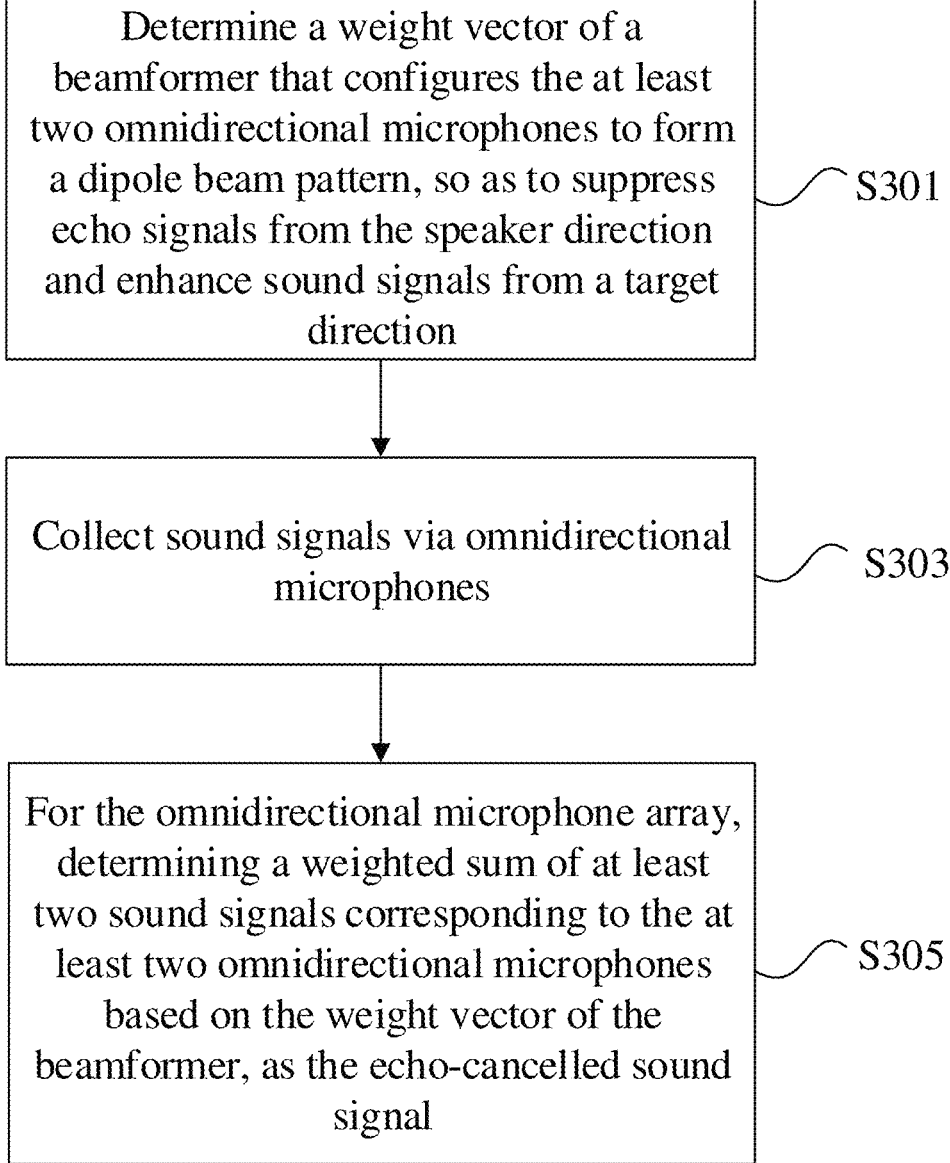

Determine a weight vector of a beamformer that configures the at least two omnidirectional microphones to form a dipole beam pattern, so as to suppress echo signals from the speaker direction and enhance sound signals from a target direction — S301

Collect sound signals via omnidirectional microphones — S303

For the omnidirectional microphone array, determining a weighted sum of at least two sound signals corresponding to the at least two omnidirectional microphones based on the weight vector of the beamformer, as the echo-cancelled sound signal — S305

Fig. 3

CONFERENCE TERMINAL AND ECHO CANCELLATION METHOD

CROSS REFERENCE TO RELATED APPLICATIONS

The present application is a U.S. national phase of International PCT Patent Application No. PCT/CN2021/125763, filed Oct. 22, 2021, which is incorporated herein by reference in its entirety.

TECHNICAL FIELD

The present application relates to a field of speech processing technology, in particular, to a conference terminal, an echo cancellation method and apparatus, and a sound pickup device.

BACKGROUND

Internet technology brings about changes in people's communication tools and cloud-based audio-visual conferencing systems are gradually popularized. Echoes may be produced during use of an audio-visual conference terminal, resulting in a speaker being able to hear his/her own voice, thereby affecting the conferencing effects. As such, echo cancellation in video conferencing environment has always been a hot topic for research.

SUMMARY

The present application provides a conference terminal. The present application additionally provides an echo cancellation method and apparatus, and a sound pickup device.

The present application provides a conference terminal, including:

a loudspeaker;

at least one omnidirectional microphone set including at least two omnidirectional microphones;

a processor; and a memory for storing a program which implements a method of echo cancellation, the terminal, after being powered up and running the program for the method through the processor, performing following steps:

determining a weight vector of a beamformer that enables the at least two omnidirectional microphones to form a dipole beam pattern to suppress an echo signal in a direction of the loudspeaker and enhance a sound signal in a target direction;

acquiring the sound signal through the omnidirectional microphones;

determining, for the omnidirectional microphone set, a weighted sum of at least two sound signals corresponding to the at least two omnidirectional microphones based on the weight vector, as an echo-canceled sound signal.

Optionally, the at least two omnidirectional microphones are two omnidirectional microphones.

Optionally, the at least one omnidirectional microphone set is three omnidirectional microphone sets centered on the loudspeaker. The three omnidirectional microphone sets cover target sound sources in all directions.

The present application further provides an echo cancellation method for a conference terminal. The conference terminal includes: a loudspeaker and at least one omnidirectional microphone set including at least two omnidirectional microphones.

The method includes:

determining a weight vector of a beamformer that enables the at least two omnidirectional microphones to form a dipole beam pattern to suppress an echo signal in a direction of the loudspeaker and enhance a sound signal in a target direction;

acquiring the sound signal through the omnidirectional microphones;

determining, for the omnidirectional microphone set, a weighted sum of at least two sound signals corresponding to the at least two omnidirectional microphones based on the weight vector of the beamformer, as an echo-canceled sound signal.

Optionally, determining the weight vector of the beamformer that enables the at least two omnidirectional microphones to form the dipole beam pattern includes:

determining a noise covariance matrix and a steering vector for the conference terminal;

determining the weight vector based on the noise covariance matrix and the steering vector by means of a Minimum Variance Distortion-free Response (MVDR) beamforming algorithm.

Optionally, the noise covariance matrix is determined in following manner:

playing data of a preset sound when the conference terminal is started;

determining a speech autocorrelation matrix as the noise covariance matrix based on the sound signal including the preset sound acquired by the omnidirectional microphones.

Optionally, it is further included that:

updating the autocorrelation matrix as an updated noise covariance matrix based on the sound signal including a conference sound acquired by the omnidirectional microphones, if it is detected that it is mute in the target direction during the conference terminal is operating.

Optionally, it is further included that:

determining a signal-to-noise ratio of the omnidirectional microphones if a movement of a target sound source is detected;

selecting, according to the signal-to-noise ratio, the echo-canceled sound signal corresponding to the at least two omnidirectional microphones in a target omnidirectional microphone set.

The present application further provides an echo cancellation apparatus which is located at a conference terminal. The conference terminal includes: a loudspeaker and at least one omnidirectional microphone set including at least two omnidirectional microphones.

The apparatus includes:

a parameter determination unit for determining a weight vector of a beamformer that enables the at least two omnidirectional microphones to form a dipole beam pattern to suppress an echo signal in a direction of the loudspeaker and enhance a sound signal in a target direction;

a sound signal acquisition unit for acquiring the sound signal through the omnidirectional microphones;

a beamforming unit for determining, for the omnidirectional microphone set, a weighted sum of at least two sound signals corresponding to the at least two omnidirectional microphones based on the weight vector of the beamformer, as an echo-canceled sound signal.

The present application further provides a sound pickup device, including:

a loudspeaker;

at least one omnidirectional microphone set including at least two omnidirectional microphones;

a processor; and a memory for storing a program which implements the echo cancellation method described above, the terminal being powered up and running the program for the method through the processor.

The present application further provides an electronic device, including:

a processor and a memory for storing a program which implements the method described above. The device is powered up and runs the program for the method through the processor.

The present application further provides a computer-readable storage medium stored with instructions which, when run on a computer, enables the computer to execute various methods described above.

The present application further provides a computer program product including instructions which, when run on a computer, enable the computer to execute various methods described above.

BRIEF DESCRIPTION OF THE DRAWINGS

The accompanying drawings constituting a part of the disclosure are used to provide further understanding of the disclosure. Schematic embodiments of the present disclosure and illustrations thereof are used to explain the disclosure, not constituting improper limitations of the disclosure. In the accompanying drawings:

FIG. 3 is a schematic flow diagram for an embodiment of an echo cancellation method provided in the present application.

DETAILED DESCRIPTION

Multiple specific details are elaborated in the following description to facilitate a full understanding of the present application. However, the present application can be implemented in many other ways which are different from those described here. Those skilled in the art could make similar analogies without deviating from the content of the present application. As such, the present application is not limited by the specific embodiments disclosed below.

Figure 1:
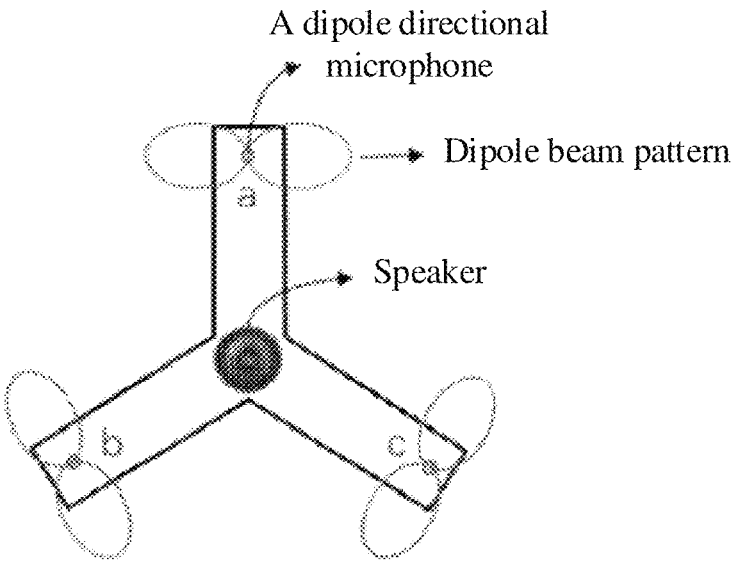
FIG. 1 is a schematic structural diagram of a conference terminal in the existing technology.

As shown in FIG. 1, a common structure of a sound pickup device in an audio-visual conferencing system is to provide a dipole directional microphone in each of surrounding three connecting rods (a, b, c) centered on a loudspeaker. The dipole directional microphone relies on an acoustic design to form a dipole beam pattern, which is capable of suppressing echoes from the loudspeaker and obtaining speeches in a target direction.

However, in the process of implementing the present invention, the inventor found that existing solutions at least have the following problem: a dipole directional microphone relies on the acoustic design to form a dipole beam pattern, the gain in the direction of the loudspeaker is not small enough to efficiently suppress echoes from the direction of the speaker.

The present application provides a conference terminal, an echo cancellation method and apparatus, and a sound pickup device, to solve the problem of poor echo canceling effect of conference terminals existing in the existing technology. Various solutions are described in a detailed manner in the embodiments below.

Compared with the existing technology, the present application has following advantages:

The conference terminal provided in embodiments of the present application includes: a loudspeaker and at least one omnidirectional microphone set including at least two omnidirectional microphones. The conference terminal determines a weight vector of a beamformer that enables the at least two omnidirectional microphones to form a dipole beam pattern to suppress an echo signal in a direction of the loudspeaker and enhance a sound signal in a target direction; acquires a plurality of signals from microphones through the omnidirectional microphones; determines, for the omnidirectional microphone set, a weighted sum of at least two signals from microphones based on the weight vector, as an echo-canceled sound signal. By applying the processing manner, two or more omnidirectional microphones are used to replace a dipole directional microphone, and combined with beamforming technology, the beam pattern is enabled to form a smaller gain in a direction of the loudspeaker with the gain being not limited by the acoustic design of the microphones. As such, echo cancellation effects can be efficiently improved.

First Embodiment

Figure 2:
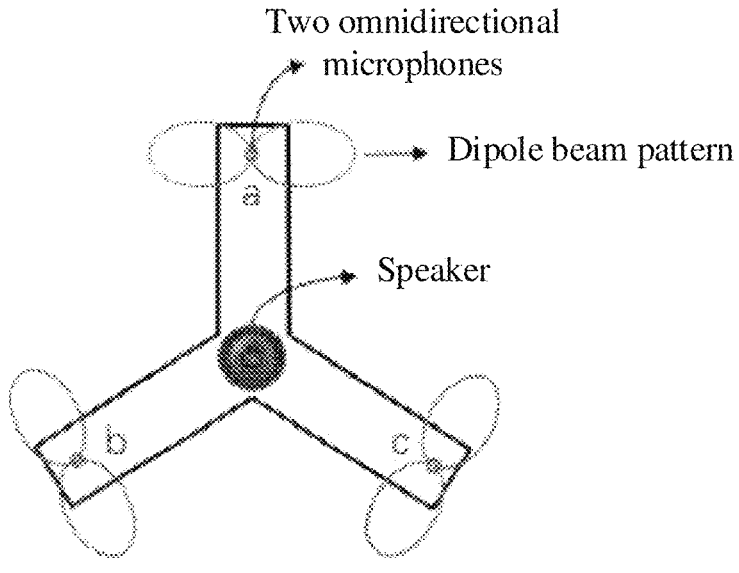
FIG. 2 is a schematic structural diagram for an embodiment of a reference terminal provided in the present application.

Reference is made to FIG. 2, which is a schematic structural diagram for an embodiment of a reference terminal in the present application. In the embodiment, the conference terminal may include: a loudspeaker and at least one omnidirectional microphone set including at least two omnidirectional microphones.

The conference terminal may be used in an audio-visual conferencing system. The audio-visual conferencing system is a system device that inter-transmits sounds, images, and document data through devices such as transmission lines and conference terminals by individuals or groups from two or more different places to realize instantaneous and interactive communication, thereby holding concurrent conferences. The conference terminal may be a speakerphone, and may also be a video conference terminal including a display and a camera.

The loudspeaker, also referred to as "a horn", is a transducer device which converts electrical signals into acoustic signals.

The omnidirectional microphones are microphones which may receive equal amounts of sounds from all sides. For example, magnetic, ceramic, and electret microphones are omnidirectional microphones.

The conference terminal includes a loudspeaker and a plurality of omnidirectional microphone sets which may be mounted around the loudspeaker to cover the entire directions of a conference site. In specific implementation, a plurality of connecting rods can be extended out from the loudspeaker, with each connecting rod mounted with an omnidirectional microphone set.

It has been experimentally shown that target sound sources in all directions around a conference terminal may be covered by using the conference terminal with the structure as shown in FIG. 2 that is centered on a loudspeaker and surrounded by three omnidirectional microphone sets.

Each omnidirectional microphone set includes at least two omnidirectional microphones to replace one directional microphone in the existing technology. The core technology of the conference terminal provided in an embodiment of the present application include: how to enable each set of omnidirectional microphones to form a dipole beam pattern by combining the beamforming technology to suppress an echo signal in the direction of the loudspeaker and enhance a sound signal in a target direction.

It should be emphasized that compared with the dipole beam pattern formed based on a dipole directional microphone in the existing technology, the dipole beam pattern formed based on two or more dipole omnidirectional microphones in an embodiment of the present application forms a smaller gain in the direction of the loudspeaker, and thus may better suppress echoes. The reason is that: the gain of a dipole directional microphone relying on "acoustic design" is not small enough, while the gain that can be achieved by two omnidirectional microphones based on a beamforming algorithm (such as MVDR) may be smaller than that can be achieved acoustically.

Reference is made to FIG. 3 which is a schematic flow diagram of echo cancellation process in an embodiment of a conference terminal in the present application. In this embodiment, echo cancellation includes following processing steps:

Step S301: determining a weight vector of a beamformer that enables the at least two omnidirectional microphones to form a dipole beam pattern to suppress an echo signal in a direction of the loudspeaker and enhance a sound signal in a target direction.

The conference terminal provided in this embodiment, combined with beamforming technology, forms a dipole beam pattern for each omnidirectional microphone set. In specific implementation, a variety of beam forming algorithms may be used to enable each omnidirectional microphone set to form a dipole beam pattern, such as a Minimum Variance Distortion-free Response (MVDR) beamforming algorithm and a Differential Beamforming Algorithm.

In an example, each omnidirectional microphone set is caused to form a dipole beam pattern through the MVDR algorithm. In specific implementation, Step S301 may include following sub-steps:

Step S3031: determining a noise covariance matrix and a steering vector for the conference terminal.

The principle of the MVDR algorithm is to minimize the noise power spectrum while ensuring the undistorted target direction as shown in Formula 1:

$$\min w^H R w \qquad \text{(Formula 1)}$$
$$st. \, w^H d(\theta) = 1$$

where w denotes a weight vector, R denotes a noise covariance matrix, $w^H Rw$ denotes a noise power spectrum, the objective function is min $w^H Rw$, denoting a minimization of the noise power spectrum. The constraint condition is $w^H d(\theta)=1$, which may ensure that the target direction is not distorted. The result of solving the objective function is a weight vector w. According to the weight vector w, a weighted sum of a plurality of sound signals in a set is calculated, and the result is an echo-suppressed sound signal.

According to Formula 1, the formula for calculating the weight vector w may be derived, as shown in Formula 2:

$$w = \frac{R^{-1}d(\theta)}{d(\theta)^H \left(R^{-1}\right)^H d(\theta)},$$

where d(θ) denotes a steering vector, R denotes a noise covariance matrix.

In the embodiment, a noise covariance matrix may be determined in two stages. One stage is an initialization stage of the conference terminal, in which the initial value of the noise covariance matrix may be determined. The other stage is during the use of the conference terminal. When participants in the environment where a conference terminal is located are not speaking (the target sound source is mute), the noise covariance matrix may be updated to better adapt to the conference environment, improve the accuracy of the noise covariance matrix, thereby improving the accuracy of the weight vector w, and subsequently enhancing the echo suppression effects.

1) Determination of the Initial Value of the Noise Covariance Matrix at the Initialization Stage of a Conference Terminal.

The noise covariance matrix is related to a conference environment in which a conference terminal is located. The same conference terminal is generally used in a plurality of conference environments. Hence, the noise covariance matrix may be determined when the conference terminal is initialized.

In an example, data of a preset sound may be played at the startup of a conference terminal. Then, a speech autocorrelation matrix may be determined as a noise covariance matrix based on a plurality of sound signals including a preset sound acquired by omnidirectional microphones. For example, the loudspeaker of a conference terminal (such as a speakerphone) first plays a speech for 2 to 4 seconds, and the autocorrelation matrix for this segment of speech is calculated as a noise covariance matrix. By adopting this processing manner, a conference terminal may achieve better echo suppression effects in different conference environments.

Determination of the autocorrelation matrix of a speech signal belongs to a relatively mature existing technology, and thus no more details will be repeated hereto.

2) Updating of the Noise Covariance Matrix at the Use Stage of a Conference Terminal.

In an example, the autocorrelation matrix is updated as an updated noise covariance matrix based on a plurality of sound signals including a conference sound (the sound of a counterpart speaker played by the loudspeaker) acquired by the omnidirectional microphones, if it is detected that it is mute in the target direction during the operation of the conference terminal. In this way, during the operation of the conference terminal, the autocorrelation matrix of the speech is calculated as a noise covariance matrix in the event that the target sound source is not sounding and the loudspeaker is playing sound.

In specific implementation, the previous noise covariance matrix can be updated by means of a smooth (smoothing) method, as shown in Formula 3:

$$R_{t+1} = \alpha R_{t+1} + (1 - \alpha)R_t, \qquad \text{Formula 3}$$

where $\alpha \in [0,1]$ is a constant coefficient. The formula indicates that the noise covariance matrix at the current moment t+1 is related to the noise covariance matrix at the moment t and moment t−1.

Due to the fact that the detection of whether it is mute in the target direction and updating of the noise covariance matrix R mentioned above belong to relative mature existing technologies, additionally, the steering vector d (0) also belongs to a relative mature existing technology, no more details will be repeated hereto.

Step S3033: determining the weight vector based on the noise covariance matrix and the steering vector by means of a Minimum Variance Distortion-free Response (MVDR) beamforming algorithm.

In this step, the weight vector may be determined on the basis of the noise covariance matrix and the steering vector, according to Formula 2.

Step S303: acquiring a plurality of sound signals through the omnidirectional microphones.

During a conference, a plurality of sound signals may be acquired through a plurality of omnidirectional microphones of a conference terminal.

Step S305: determining, for the omnidirectional microphone set, a weighted sum of at least two sound signals based on the weight vector, as an echo-canceled sound signal.

The weight vector may include weight vectors corresponding to each omnidirectional microphone of the at least two omnidirectional microphones. For example, an omnidirectional microphone set includes two omnidirectional microphones, the weight vector includes then two weight vectors.

For any omnidirectional microphone set, a weighted sum of at least two sound signals is determined as an echo-canceled sound signal according to the weight vector of the beamformer. For example, the conference terminal includes three omnidirectional microphone sets, three echo-canceled sound signals are then obtained.

It should be noted that the amount of the omnidirectional microphone set(s) is generally associated with the space of a conference environment. For most environments with limited space, three omnidirectional microphone sets may cover target sound sources in the full direction around the conference terminal. For a conference environment with larger space, more omnidirectional microphone sets, e.g., four sets, five sets and so forth, may be set up to cover the full direction of the conference site.

It has been experimentally shown that a dipole beam pattern may be formed by combining the beamforming technology in the case where each omnidirectional microphone set includes two omnidirectional microphones. As such, the echo cancellation effects can be improved, and the device cost can be reduced. In specific implementation, it is also possible to include two or more omnidirectional microphones in each omnidirectional microphone set. However, this will increase the device cost.

In addition, in the event that each omnidirectional microphone set includes two omnidirectional microphones, the spacing between the two omnidirectional microphones will exert an effect on the echo suppression performance. Experiments have shown that for the performance of suppressing the echo direction of the loudspeaker, a 3 cm interval between two omnidirectional microphones is better than 7 cm.

As can be seen by comparing FIG. 1 with FIG. 2, the gain oriented towards the direction of the loudspeaker (a broadside direction) formed according to the existing technology is larger than the gain formed in the loudspeaker-oriented direction according to the solutions of the present application, and thus the solutions in the present application may better suppress echoes. Meanwhile, the gain oriented towards the target direction (an endfire direction) formed according to the existing technology is smaller than the gain formed in the target-oriented direction according to the solutions of the present application. Hence, the solutions in the present application may better enhance the conference speech.

In an example, a speaker such as host/hostess at an evening party may move around the conference site. Under this circumstance, the process of echo cancellation may further include following steps:

Step S401: determining a signal-to-noise ratio of the omnidirectional microphones if a movement of a target sound source is detected.

In specific implementation, whether a target sound source is moving may be detected through existing technologies, and a signal-to-noise ratio (SNR) of each omnidirectional microphone may be determined through existing technologies.

Step S403: selecting, according to the signal-to-noise ratio, the echo-canceled sound signal corresponding to the at least two omnidirectional microphones in a target omnidirectional microphone set.

For example, it is selected an echo-canceled sound signal of an omnidirectional microphone set with the highest signal-to noise ratio that is obtained by performing the Step S301 to Step S305 mentioned above.

In the embodiment, better echo suppression effects may be obtained even when the sound source is moving by executing Step S401 and Step S403.

It can be seen from the above embodiments that the conference terminal provided in embodiment of the present application includes: a loudspeaker and at least one omnidirectional microphone set including at least two omnidirectional microphones. The reference terminal determines a weight vector of a beamformer that enables the at least two omnidirectional microphones to form a dipole beam pattern to suppress an echo signal in a direction of the loudspeaker and enhance a sound signal in a target direction; acquires a sound signal through the omnidirectional microphones; and determines, for the at least two omnidirectional microphones, a weighted sum of at least two sound signals according to a weight vector of the beamformer, as an echo-canceled sound signal. By applying the processing manner, two or more omnidirectional microphones are used to replace a dipole directional microphone, and combined with beamforming technology, the beam pattern is enabled to form a smaller gain in a direction of the loudspeaker with the gain being not limited by the acoustic design of the microphones. As such, echo cancellation effects can be efficiently improved.

Second Embodiment

In the above embodiment, a conference terminal is provided. Correspondingly, the present application also provides an echo cancellation method which corresponds to the device embodiments described above. Since the method embodiments are basically similar to the device embodiments, the description thereto is relatively simple. For relevant details, please refer to the partial description of the device embodiments. The method embodiments described below are merely illustrative.

The present application further provides an echo cancellation method for a conference terminal. The conference terminal includes: a loudspeaker and at least one omnidirectional microphone set including at least two omnidirectional microphones. In the embodiment, the method may include the following steps:

Step S301: determining a weight vector of a beamformer that enables the at least two omnidirectional microphones to form a dipole beam pattern to suppress an echo signal in a direction of the loudspeaker and enhance a sound signal in a target direction;

Step S303: acquiring a sound signal through the omnidirectional microphones;

Step S305: determining, for the omnidirectional microphone set, a weighted sum of at least two sound signals corresponding to the at least two omnidirectional microphones based on the weight vector of the beamformer, as an echo-canceled sound signal.

During specific implementation, Step S301 may include the following sub-steps: determining a noise covariance matrix and a steering vector for the conference terminal; determining the weight vector based on the noise covariance matrix and the steering vector by means of a Minimum Variance Distortion-free Response (MVDR) beamforming algorithm.

In specific implementation, the noise covariance matrix may be determined in the following manner: playing data of a preset sound when the conference terminal is started; determining a speech autocorrelation matrix as the noise covariance matrix according to the sound signal including the preset sound acquired by the omnidirectional microphones. With this processing manner, the conference terminal can achieve better echo suppression effects in different conference environments.

In an example, the method may further include the following step: updating the autocorrelation matrix as an updated noise covariance matrix based on the sound signal including a conference sound acquired by the omnidirectional microphones, if it is detected that it is mute in the target direction during the operation of the conference terminal. Use of this processing manner may better adapt to a conference environment, and enhance the accuracy of the noise covariance matrix, thereby improving the accuracy of the weight vector and subsequently enhancing the echo suppression effects.

In an example, the method may further include the following steps: determining a signal-to-noise ratio of the omnidirectional microphones if a movement of a target sound source is detected; selecting, according to the signal-to-noise ratio, the echo-canceled sound signal corresponding to the at least two omnidirectional microphones in a target omnidirectional microphone set. With the processing manner, better echo suppression effects may still be obtained when a sound source is moving.

Third Embodiment

In the embodiment above, an echo cancellation method is provided. Correspondingly, the present application also provides an echo cancellation apparatus which corresponds to the method embodiments described above. Since the apparatus embodiments are basically similar to the method embodiments, the description thereto is relatively simple. For relevant details, please refer to the partial description of the method embodiments. The apparatus embodiments described below is merely illustrative.

The present application additionally provides an echo cancellation apparatus located at a conference terminal. The conference terminal includes: a loudspeaker and at least one omnidirectional microphone set including at least two omnidirectional microphones.

The apparatus includes:

a parameter determination unit for determining a weight vector of a beamformer that enables the at least two omnidirectional microphones to form a dipole beam pattern to suppress an echo signal in a direction of the loudspeaker and enhance a sound signal in a target direction;

a sound signal acquisition unit for acquiring the sound signal through the omnidirectional microphones;

a beamforming unit for determining, for the omnidirectional microphone set, a weighted sum of at least two sound signals corresponding to the at least two omnidirectional microphones based on the weight vector of the beamformer, as an echo-canceled sound signal.

In an example, the parameter determination unit may be specifically used to determine a noise covariance matrix and a steering vector for the conference terminal; and determine the weight vector based on the noise covariance matrix and the steering vector by means of a Minimum Variance Distortion-free Response (MVDR) beamforming algorithm.

In an example, the noise covariance matrix may be determined in the following manner: playing data of a preset sound when the conference terminal is started; and determining a speech autocorrelation matrix as the noise covariance matrix based on the sound signal including the preset sound acquired by the omnidirectional microphones. With this processing manner, the conference terminal can achieve better echo suppression effects in different conference environments.

In an example, the apparatus may further include:

a noise covariance matrix update unit for updating the autocorrelation matrix as an updated noise covariance matrix based on the sound signal including a conference sound acquired by the omnidirectional microphones, if it is detected that it is mute in the target direction during the operation of the conference terminal. Use of this processing manner may better adapt to a conference environment, and enhance the accuracy of the noise covariance matrix, thereby improving the accuracy of the weight vector, and subsequently enhancing the echo suppression effects.

In an example, the apparatus may further include:

a signal-to-noise ratio determination unit for determining, when the conference terminal is operating, a signal-to-noise ratio of the omnidirectional microphones if a movement of a target sound source is detected;

an echo suppression signal selection unit for selecting, according to the signal-to-noise ratio, the echo-canceled sound signal corresponding to the at least two omnidirectional microphones in a target omnidirectional microphone set. With this processing manner, better echo suppression effects may be obtained even when the sound source is moving.

Fourth Embodiment

In above embodiments, an echo cancellation method is provided. Correspondingly, the present application also provides an electronic device which corresponds to the method embodiments described above. Since the device embodiments are basically similar to the method embodiments, the description thereto is relatively simple. For relevant details, please refer to the partial description of the method embodiments. The device embodiments described below are merely illustrative.

The present application additionally provides an electronic device, including: a loudspeaker; at least one omni-directional microphone set including at least two omnidirectional microphones; a processor; and a memory. The memory is used to store a program for implementing the echo cancellation method described above. The terminal is powered up and runs the program of the method through the processor.

The electronic device may be an audio-visual conference terminal, and may also be a sound pickup device.

Although the present application is disclosed as above with preferred embodiments, the embodiments are not used to limit the present application. Those skilled in the art may make possible modifications and amendments without departing from the spirt and scope of the present application. Hence, the scope of protection of the present application should be subject to the scope defined by the claims of the present application.

In a typical configuration, a computing device includes one or more processors (CPUs), input/output interfaces, a network interface, and a memory.

The memory may include a volatile memory in computer readable media, a random-access memory (RAM) and/or non-volatile RAM, and other forms such as a read-only memory (ROM) or a flash memory (flash RAM). The memory is an example of computer readable media.

1. The computer readable media include permanent and non-permanent, removable and non-removable media that may implement information storage with any method or technology. The information may be computer readable instructions, data structures, modules of a program or other data. Examples of computer storage media include but not limited to a phase change random access memory (PRAM), a static random access memory (SRAM), a dynamic random access memory (DRAM), other types of random access memory (RAM), a read-only memory (ROM), an electrically erasable programmable read-only memory (EE-PROM), a flash memory or other memory technologies, a compact disc read-only memory (CD-ROM), a digital versatile disc (DVD) or other optical storages, a magnetic cassette tape, a magnetic tape/disk storage or other magnetic storage devices or any other non-transmission media that may be used for storing information that is accessible to a computing device. According to the definition herein, the computer readable media do not include transitory computer readable media (transitory media) such as modulated data signals and carrier waves.

2. Those skilled in the art should understand that the embodiments of the present application may be provide as a method, a system or a computer program product. Accordingly, the present application may take the form of entirely hardware embodiments, entirely software embodiments or embodiments combining software and hardware aspects. Moreover, the present invention may use a form of computer program product implemented on one or more storage media available to computers (including but not limited to magnetic disk storages, CD-ROMs, optical memories and so forth) comprising program codes available to computers.

What is claimed is:

1. A conference terminal, comprising:
a loudspeaker;
at least one omnidirectional microphone set comprising at least two omnidirectional microphones;
a processor; and a memory for storing a program which implements an echo cancellation method, the conference terminal, after being powered up and running the program for the echo cancellation method through the processor, performing the following steps:
determining a weight vector of a beamformer that enables the at least two omnidirectional microphones to form a dipole beam pattern, wherein the weight vector is configured to suppress an echo signal in a direction of the loudspeaker and enhance a sound signal in a target direction;
acquiring the sound signal through the at least two omnidirectional microphones, wherein the sound signal comprises the echo signal in the direction of the loudspeaker and the sound signal in the target direction; and
determining, for the omnidirectional microphone set, a weighted sum of at least two sound signals acquired by the at least two omnidirectional microphones based on the weight vector of the beamformer, wherein the weighted sum is an echo-canceled sound signal.

2. The conference terminal according to claim 1, wherein the number of the at least two omnidirectional microphones is two.

3. The conference terminal according to claim 1, wherein the number of the at least one omnidirectional microphone set is three, three omnidirectional microphone sets are arranged centered on the loudspeaker, the three omnidirectional microphone sets covering target sound sources in all directions.

4. An echo cancellation method for a conference terminal, wherein the conference terminal comprises: a loudspeaker and at least one omnidirectional microphone set comprising at least two omnidirectional microphones;
the echo cancellation method comprising:
determining a weight vector of a beamformer that enables the at least two omnidirectional microphones to form a dipole beam pattern, wherein the weight vector is configured to suppress an echo signal in a direction of the loudspeaker and enhance a sound signal in a target direction;
acquiring the sound signal through the at least two omnidirectional microphones, wherein the sound signal comprises the echo signal in the direction of the loudspeaker and the sound signal in the target direction; and
determining, for the omnidirectional microphone set, a weighted sum of at least two sound signals acquired by the at least two omnidirectional microphones based on the weight vector of the beamformer, wherein the weighted sum is an echo-canceled sound signal.

5. The method according to claim 4, wherein determining the weight vector of the beamformer that enables the at least two omnidirectional microphones to form the dipole beam pattern, comprises:
determining a noise covariance matrix and a steering vector for the conference terminal; and
determining the weight vector based on the noise covariance matrix and the steering vector by means of a Minimum Variance Distortion-free Response (MVDR) beamforming algorithm.

6. The method according to claim 5, wherein the noise covariance matrix is determined by:
playing data of a preset sound when the conference terminal is started; and
determining a speech autocorrelation matrix as the noise covariance matrix based on the sound signal comprising the preset sound acquired by the at least two omnidirectional microphones.

7. The method according to claim 6, further comprising:
updating the autocorrelation matrix as an updated noise covariance matrix based on the sound signal comprising a conference sound acquired by the at least two omnidirectional microphones, if it is detected that it is mute in the target direction during the operation of the conference terminal.

8. The method according to claim 4, further comprising:
determining a signal-to-noise ratio of the at least two omnidirectional microphones if a movement of a target sound source is detected; and
selecting, according to the signal-to-noise ratio, the echo-canceled sound signal corresponding to the at least two omnidirectional microphones in a target omnidirectional microphone set.

9. A sound pickup device, comprising:
a loudspeaker;
at least one omnidirectional microphone set comprising at least two omnidirectional microphones;
a processor; and
a memory for storing a program which implements the echo cancellation method according to claim 4, the terminal being powered up and running the program for the echo cancellation method through the processor.

10. The sound pickup device according to claim 9, wherein the program implements the following steps:
determine a noise covariance matrix and a steering vector for the conference terminal; and
determine the weight vector based on the noise covariance matrix and the steering vector by means of a Minimum Variance Distortion-free Response (MVDR) beam-forming algorithm.

11. The sound pickup device according to claim 9, wherein the program implements the following steps:
play data of a preset sound when the conference terminal is started; and
determine a speech autocorrelation matrix as the noise covariance matrix based on the sound signal comprising the preset sound acquired by the at least two omnidirectional microphones.

12. The sound pickup device according to claim 9, wherein the program implements the following steps:
update the autocorrelation matrix as an updated noise covariance matrix based on the sound signal comprising a conference sound acquired by the at least two omnidirectional microphones, if it is detected that it is mute in the target direction during the operation of the conference terminal.

13. The sound pickup device according to claim 9, wherein the program implements the following steps:
determine a signal-to-noise ratio of the at least two omnidirectional microphones if a movement of a target sound source is detected; and select, according to the signal-to-noise ratio, the echo-canceled sound signal corresponding to the at least two omnidirectional microphones in a target omnidirectional microphone set.

14. A computer program, comprising: computer-readable codes which, when run on a computing processing device, cause the computing processing device to execute the echo cancellation method according to claim 4.

15. A non-transitory computer-readable medium storing the computer program of claim 14.

16. The computer program according to claim 14, wherein the computer-readable codes, when run on a computing processing device, cause the computing processing device to execute the following steps:
determine a noise covariance matrix and a steering vector for the conference terminal; and
determine the weight vector based on the noise covariance matrix and the steering vector by means of a Minimum Variance Distortion-free Response (MVDR) beam-forming algorithm.

17. The computer program according to claim 14, wherein the computer-readable codes, when run on a computing processing device, cause the computing processing device to execute the following steps:
play data of a preset sound when the conference terminal is started; and
determine a speech autocorrelation matrix as the noise covariance matrix based on the sound signal comprising the preset sound acquired by the at least two omnidirectional microphones.

18. The computer program according to claim 14, wherein the computer-readable codes, when run on a computing processing device, cause the computing processing device to execute the following steps:
update the autocorrelation matrix as an updated noise covariance matrix based on the sound signal comprising a conference sound acquired by the at least two omnidirectional microphones, if it is detected that it is mute in the target direction during the operation of the conference terminal.

19. The computer program according to claim 14, wherein the computer-readable codes, when run on a computing processing device, cause the computing processing device to execute the following steps:
determine a signal-to-noise ratio of the at least two omnidirectional microphones if a movement of a target sound source is detected; and
select, according to the signal-to-noise ratio, the echo-canceled sound signal corresponding to the at least two omnidirectional microphones in a target omnidirectional microphone set.

20. The non-transitory computer-readable medium according to claim 14, wherein the non-transitory computer-readable medium stores the computer program.

* * * * *